April 1, 1924.
J. P. CLIFTON
PIPE COUPLING
Filed March 9, 1922
1,489,065
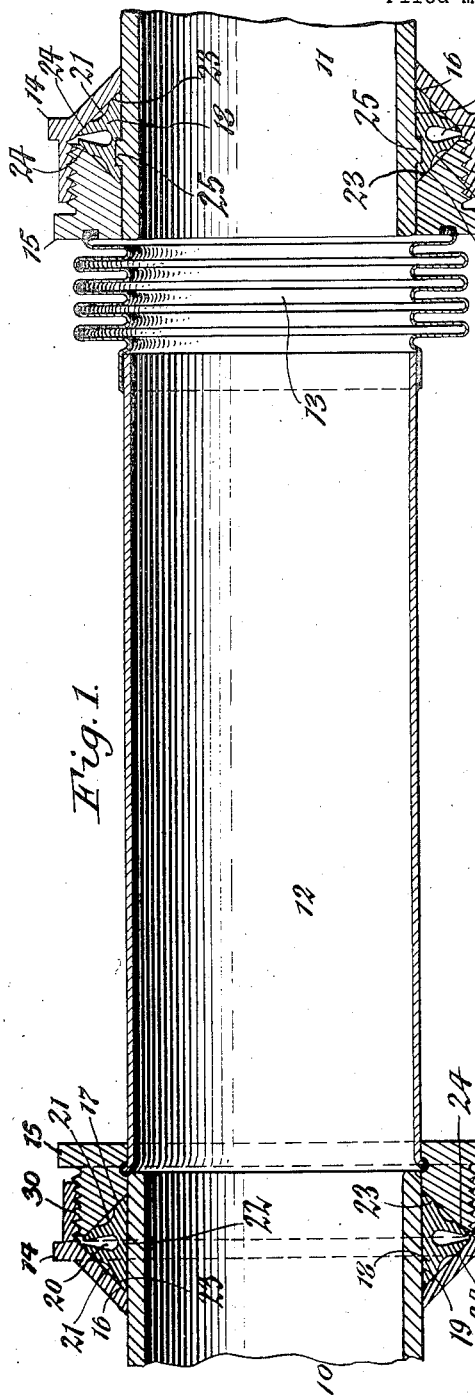
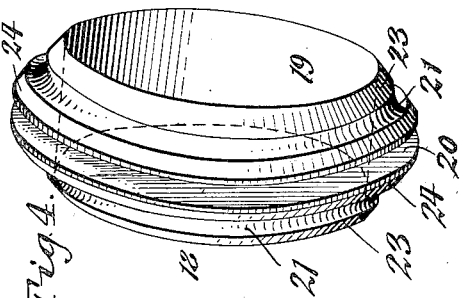
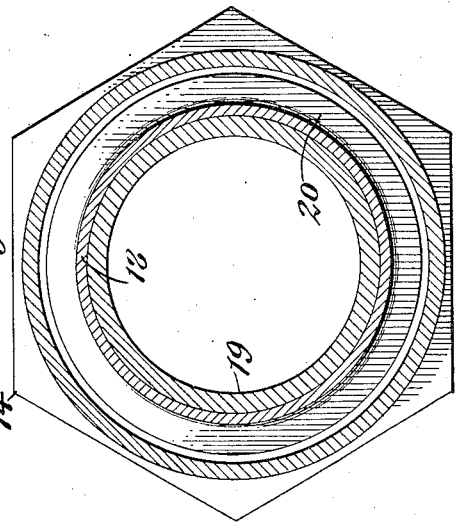
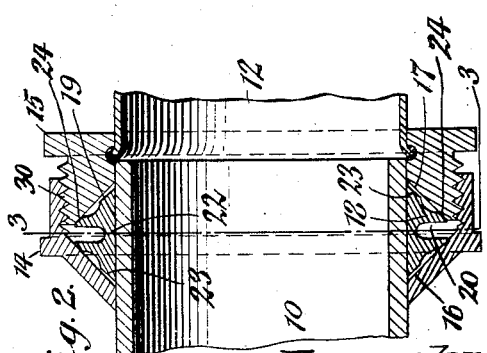

Patented Apr. 1, 1924.

1,489,065

UNITED STATES PATENT OFFICE.

JAMES P. CLIFTON, OF BUFFALO, NEW YORK.

PIPE COUPLING.

Application filed March 9, 1922. Serial No. 542,474.

*To all whom it may concern:*

Be it known that I, JAMES P. CLIFTON, a citizen of the United States, residing at Buffalo, in the county of Erie and State of New York, have invented new and useful Improvements in Pipe Couplings, of which the following is a specification.

This invention relates to a pipe coupling which is more particularly designed for connecting a water circulating pipe between the radiator and gas engine jacket of an automobile although the same may be used to advantage elsewhere.

It is the purpose of this invention to provide a coupling of this character which permits of readily and easily coupling such a circulating pipe with the conduits or nipples of the radiator and engine water jacket and to accomplish this in a manner which will effectively prevent leakage under the severest usage.

In the accompanying drawings:

Figure 1 is a longitudinal section of a water-circulating pipe or conduit connected at its opposite ends with the nipples or conduits of the radiator and gas engine water jacket of an automobile. Figure 2 is a similar view of one of the couplings showing the position of the parts before the packing is tightened. Figure 3 is a cross section on line 3—3, Fig. 2. Figure 4 is a perspective view of the packing ring embodying my invention.

Similar characters of reference refer to like parts throughout the several views.

Although my invention may be employed in various installations the same is shown in the drawings in connection with one of the metal coupling nipples 10 of the radiator, the metal coupling nipple or conduit 11 of the engine water jacket, and the intermediate pipe or conduit which in the present instance consists of a rigid metal tubular section 12 arranged end to end with the radiator nipple and a flexible pleated metal section 13 arranged end to end with the jacket nipple 11 and connected with the rigid section.

The nipple of the radiator is connected with the adjacent end of the rigid section of the intermediate conduit and the nipple of the jacket is connected with the adjacent end of the flexible section of the intermediate conduit by couplings embodying my invention and as these couplings are substantially alike the following description of one will apply to both:

14, 15 represent two clamping collars surrounding each of the nipples or conduits and adjustably connected with each other by a screw joint 30 and one member of each of said pairs of collars being connected with the adjacent section of the intermediate conduit by soldering, sweating or otherwise. The inner sides of the clamping collars of each pair are provided with opposing conical bearing surfaces 16, 17 which have their large ends next to each other and taper therefrom in opposite directions, thereby forming an annular channel between the clamping rings and the periphery of the respective nipple or conduit which is of substantially triangular form in cross section.

Within this channel is arranged a packing ring 18 of soft metal such as lead or an alloy of the same. This packing ring is substantially triangular in cross section and provided with a cylindrical bore 19 adapted to bear against the periphery of the respective nipple or conduit while its opposite edges are bevelled and form conical faces which have their large ends at the periphery of the ring and their small ends at the bore of the same. At the junction of the large ends of the conical faces of the packing ring on the periphery thereof the same is provided with a deep central circumferential groove 20 and in each of the conical faces of the packing ring the same is provided with a comparatively shallow side circumferential groove 21. Before tightening the coupling on the nipple or conduit the opposing walls of the main central groove are radial and parallel relatively to each other, as shown in Fig. 2. Upon turning the clamping collars so that they approach each other, by reason of the screw connection between the same, the inner parts of the conical faces of these collars engage with the small ends 23 of the conical faces of the packing ring while the outer parts of the conical faces of the clamping collars engage with the large ends 24 of the conical faces of the packing ring. Inasmuch as the inner opposing sides of the outer large ends 24 of the packing ring cones are unsupported the inward pressure against the same by the clamping collars causes these parts of the packing ring to be turned toward each other, in the manner of levers, as shown at the left hand end of Fig. 1, thereby causing the central part 22 of the bore of the packing ring to be firmly pressed inwardly against the periphery of the nipple or conduit.

At the same time the small ends 23 of the packing ring are also pressed inwardly around the periphery of the nipple or conduit by the small inner ends of the conical faces of the clamping collars, whereby the packing ring is contracted in three separated zones or areas around the nipple or conduit and leakage through the joint is positively prevented. This radially inward movement of the small ends of the packing ring and the deflection of the outer large ends of the clamping ring cones toward each other for pressing the central part of the packing ring radially inward is possible by reason of the shallow side grooves 21 in the conical faces of the packing ring which permits these parts of this ring to readily move independently of each other in the direction mentioned.

The tightening of the packing ring around the nipple or conduit is possible regardless of whether the periphery of the nipple is plain, as shown at the left of Fig. 1, or whether the periphery is provided with an annular bead or flange 25, as shown at the right of the same figure. These beads are found on the nipples of some automobiles and in such cases the packing ring of my improved coupling is simply pressed inwardly so as to embrace this bead and produce a tight joint in the same manner as in a beadless nipple.

When my improved packing ring is applied to a nipple or conduit having such a bead the bore of the packing ring is originally made large enough to slip over this bead preparatory to being compressed on the same so as to become interlocked therewith.

My improved coupling not only permits of producing a perfect watertight joint but the same can also be manufactured at low cost and installed readily without specially skilled help.

I claim as my invention:

1. A pipe coupling for connecting two conduits comprising two clamping collars which surround one of said conduits and are connected with each other by a screw joint and one of which is connected with the other conduit, said compression collars being provided on their opposing inner sides with conical faces which enlarge toward each other, and a packing ring of soft metal arranged between said conical faces of said collars and around the respective conduit, said packing ring having an inner cylindrical face which engages the periphery of the adjacent conduit, and conical faces at its opposite edges which engage with the conical faces of said collars.

2. A pipe coupling for connecting two conduits comprising two clamping collars which surround one of said conduits and are connected with each other by a screw joint and one of which is connected with the other conduit, said compression collars being provided on their opposing inner sides with conical faces which enlarge toward each other, and a packing ring of soft metal arranged between said conical faces of said collars and around the respective conduit, said packing ring having an inner cylindrical face which engages the periphery of the adjacent conduit, conical faces at its opposite edges which engage with the conical faces of said collars, and a circumferential groove on its periphery at the junction of its conical faces.

3. A pipe coupling for connecting two conduits comprising two clamping collars which surround one of said conduits and are connected with each other by a screw joint and one of which is connected with the other conduit, said compression collars being provided on their opposing inner sides with conical faces which enlarge toward each other, and a packing ring of soft metal arranged between said conical faces of said collars and around the respective conduit, said packing ring having an inner cylindrical face which engages the periphery of the adjacent conduit, conical faces at its opposite edges which engage with the conical faces of said collars, a circumferential groove on its periphery at the junction of its conical faces, and annular grooves on the conical faces of the packing ring.

JAMES P. CLIFTON.